March 12, 1957  P. R. FRANKLIN, JR  2,784,596
REFRIGERATOR DRIVE FOR REFRIGERATED VEHICLES
Filed July 7, 1953
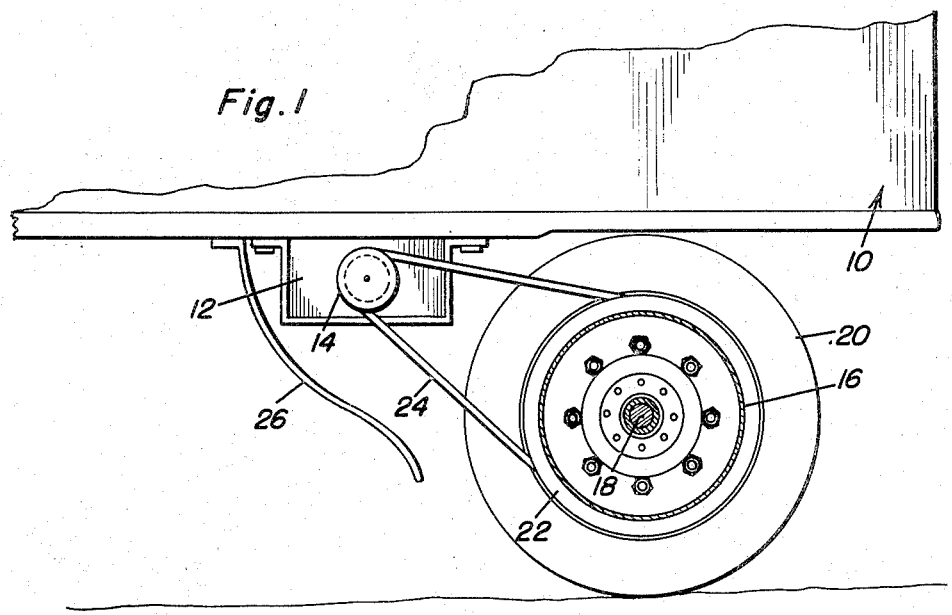
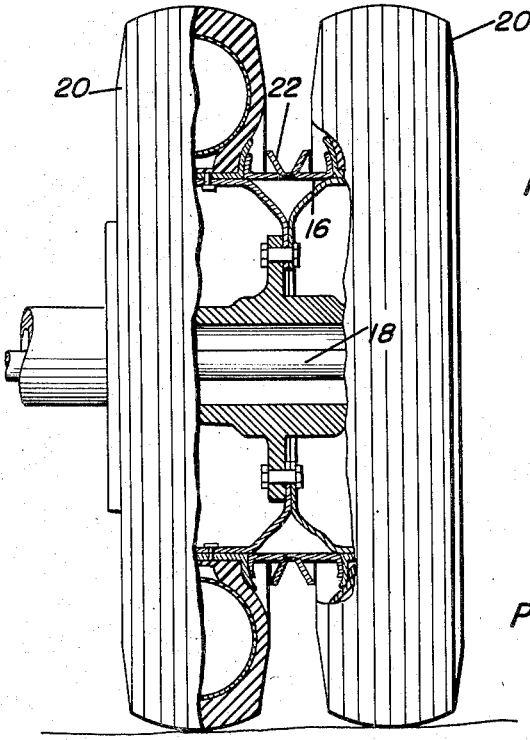
Paul R. Franklin, Jr.
INVENTOR.

United States Patent Office 2,784,596
Patented Mar. 12, 1957

2,784,596

REFRIGERATOR DRIVE FOR REFRIGERATED VEHICLES

Paul R. Franklin, Jr., Manor, Pa.

Application July 7, 1953, Serial No. 366,435

3 Claims. (Cl. 74—13)

This invention relates to new and useful improvements and structural refinements in means for driving or actuating the refrigerating equipment of vehicles equipped with refrigerated bodies.

Specifically, the invention concerns itself with apparatus of this type wherein the compressor of the refrigerating equipment is driven by a belt, or otherwise, from the road or traveling wheel of the vehicle. In conventional practice, it was customary to attach a pulley to the outside of the road wheel and to connect such a pulley with the driving pulley of the refrigerant compressor. However, since the drive pulley was disposed at the outside of the road wheel, it was subjected to frequent damage, such as for example, upon coming in contact with curbs or other obstructions.

In accordance with the instant invention, the drive pulley or a ring on the road wheel is disposed between rather than on the outside of the tires of the wheel, so that it is effectively protected against injury or damage.

Some of the advantages of the invention reside in its simplicity of construction, in its adaptability to installation on refrigerated vehicles of different types and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a fragmentary side elevational view of a vehicle having the invention associated therewith, and Figure 2 is an elevational view of the wheel, partly broken away so as to reveal the invention.

Briefly summarized the invention, as is evident, has to do with an accessory or attachment for practical use on and in conjunction with a refrigerated type highway vehicle, more particularly the refrigeration unit thereon. More specifically the concept pertains to the combination of an axle, dual wheels removably mounted on said axle, each wheel including a wheel rim having a tire operatively mounted thereon, opposed inward peripheral portions of the tire rims and the opposed walls of the tires on the individual rims being spaced apart in parallelism, a power take-off pulley located in said space and clamped between and driven by the outer peripheral portions of the respective tire rims, said pulley being of an outside diameter approximately equivalent to the outside diameter of said tire rims, said pulley being adapted to accommodate an endless belt which serves, when it is operatively connected with the pulley to transmit motion to said refrigeration unit, said belt being confined and retained for operation in the space between the opposed walls of the respective tires.

Like characters of reference are employed to designate like parts in the specification and throughout the several views.

Referring now to the accompanying drawings in detail, the general reference character 10 designates a refrigerated vehicle body having a refrigeration unit 12 mounted underneath thereof, said unit including a compressor (not shown) driven by a pulley 14.

The vehicle is also provided with a plurality of road wheels or traveling wheels, one of which is designated by the reference character 16, the same being carried by a conventional axle 18.

The wheel 16 is in the form of a cylindrical body of a substantial width, the same having suitably mounted thereon a pair of spaced tires 20.

The essence of novelty of the invention resides in the provision of a drive pulley or ring 22 which is secured to the wheel 16 between the two tires 20 and is operatively connected by an endless belt or other drive element 24 to the aforementioned pulley 14.

It will be observed that by having the pulley or ring 22 disposed between the tires 20, the same will be effectively protected against damage by coming in contact with curbs or other obstructions.

Needless to say, a suitable jockey pulley (not shown) may be employed for maintaining the belt 24 in a taut condition regardless of the rising or falling movement of the wheel 16 with respect to the vehicle body, and also if desired, a protector or guard 26 may be secured to the underside of the body forwardly of the drive belt 24.

While in the foregoing there has been shown and described the preferred embodiment of this invention, it is to be understood that minor changes in the details of construction and arrangement of parts may be resorted to without departing from the spirit and scope of the invention as claimed.

What is claimed as new is as follows:

1. For use on and in conjunction with a refrigerated-type highway vehicle having a refrigeration unit, in combination an axle, dual wheels removably mounted on said axle, each wheel including a wheel rim having a tire operatively mounted thereon, opposed inward peripheral portions of the tire rims and the opposed walls of the tires on the individual rims being spaced apart in parallelism, a power take-off pulley located in said space and clamped between and driven by the outer peripheral portions of the respective tire rims, said pulley being of an outside diameter approximately equivalent to the outside diameter of said tire rims, said pulley being adapted to accommodate an endless belt which serves, when it is operatively connected with the pulley to transmit motion to said refrigeration unit, said belt being confined and retained for operation in the space between the opposed walls of the respective tires.

2. The structure defined in claim 1 and wherein said power take-off pulley comprises a rim, the respective edge portions of said rim being provided with inner and outer peripheral outstanding endless flanges, and a substantially V-shaped power take-off drive ring fixedly mounted on the central portion of encompassing said rim and situated midway between the respective flanges, said flanges being conformable in shape and size with companion portions of the tire rims and being thus designed, are function-bound and securely clamped between said tire rims.

3. For use on and in conjunction with a refrigerated-type vehicle having a refrigeration unit characterized by a pulley adapted to be driven by a belt, in combination, an axle, dual wheels removably mounted on said axle, each dual wheel arrangement being characterized by a pair of opposed companion separably connected wheels, said wheels having portions which are separably bolted together and having tire-equipped rims, a readily applicable and removable belt accommodating power take-off pulley embodying a rigid annulus constituting a rim, said rim being wide and bridging the space between the respective tire rims and having inwardly and outwardly disposed marginal portions conformable to and having friction driving contact with cooperating portions of the rims between which said edge portions are clampingly and frictionally bound, the predetermined width of said rim being appreciably greater than the cross-section of the belt which is to derive motion from the rotation of the rim in conjunction with dual wheels and being of a diameter such that the outer peripheral surface of the rim is spaced inwardly from the normal tread portions of said tires, and means fixedly mounted on the peripheral surface of said rim intermediate the respective inward and outward marginal portions to accommodatingly seat and frictionally drive an endless transmitting belt which serves, when operatively mounted to transmit motion to the pulley on said refrigeration unit, whereby the portion of said belt which takes the power from said means operates within the confines of the space between said dual wheels.

References Cited in the file of this patent
UNITED STATES PATENTS

| | | |
|---|---|---|
| 2,275,166 | Bancroft | Mar. 3, 1942 |
| 2,329,099 | Burger | Sept. 7, 1943 |
| 2,426,342 | Couse | Aug. 26, 1947 |